(12) United States Patent
Lasarov et al.

(10) Patent No.: US 9,413,861 B2
(45) Date of Patent: Aug. 9, 2016

(54) METALLIZATION AND ANODIZATION OF PLASTIC AND CONDUCTIVE PARTS OF THE BODY OF AN APPARATUS

(71) Applicant: Nokia Technologies Oy, Espoo (FI)

(72) Inventors: Harri Lasarov, Sunnyvale, CA (US); Anton Fahlgren, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 488 days.

(21) Appl. No.: 13/645,996

(22) Filed: Oct. 5, 2012

(65) Prior Publication Data

US 2014/0098502 A1    Apr. 10, 2014

(51) Int. Cl.
*H05K 7/00*    (2006.01)
*H05K 1/09*    (2006.01)
*H05K 1/03*    (2006.01)
(Continued)

(52) U.S. Cl.
CPC .................................. *H04M 1/0283* (2013.01)

(58) Field of Classification Search
CPC ........... H01L 2224/32225; H01L 2224/16225; H01L 2924/3025; H01L 2224/45124; H03H 1/0007; H01F 27/02; H05K 1/095; H05K 2201/0347; H05K 3/246; H05K 1/0306; H05K 2201/0133; H05K 2201/0329; H05K 2201/0338; H05K 3/284; H05K 9/0096; B32B 2037/243; B32B 2038/00925; B32B 15/043; B32B 2307/202; B32B 2311/00; B32B 2457/00; C23C 18/1641; C23C 18/206; C23C 18/31; C23C 28/021; H01B 1/124
USPC ........................................... 361/746, 752, 765
See application file for complete search history.

(56) References Cited

U.S. PATENT DOCUMENTS 4,123,756 A * 10/1978 Nagata et al. ................. 343/702
4,483,811 A * 11/1984 Hirata ............... B29C 45/14549
264/162

(Continued)

FOREIGN PATENT DOCUMENTS

EP    1 880 821 A1    1/2008
JP    2009 262530 A    11/2009

(Continued)

OTHER PUBLICATIONS

International Search Report and Written Opinion for Application No. PCT/FI2013/050953 dated Feb. 17, 2014.

(Continued)

*Primary Examiner* — Robert J Hoffberg
*Assistant Examiner* — Michael Matey
(74) *Attorney, Agent, or Firm* — Alston & Bird LLP

(57) ABSTRACT

A method of fabricating at least a portion of the body of an apparatus, such as a portable electronic device, that includes both plastic and conductive parts is provided with the body appearing relatively seamless such that the interface between the plastic and conductive parts is indistinguishable. In this regard, a plastic part may be combined with a conductive part to form at least a portion of the body of the portable electronic device. The surfaces of the plastic part and the conductive part may be metallized, such as by being subjected to vapor deposition, to metalize the surfaces of the plastic and conductive parts. The metalized surfaces of the plastic and conductive parts may then be anodized, thereby producing at least a portion of the body of a portable electronic device having plastic and conductive parts with a consistent appearance and a consistent tactile response.

20 Claims, 5 Drawing Sheets

(51) Int. Cl.
*H05K 1/02* (2006.01)
*H04M 1/02* (2006.01)

(56) References Cited

U.S. PATENT DOCUMENTS

| | | | |
|---|---|---|---|
| 4,974,307 A * | 12/1990 | Uebayashi et al. | 29/460 |
| 5,012,387 A * | 4/1991 | Ohlenburger | H05K 1/0206 165/80.3 |
| 5,030,548 A * | 7/1991 | Fujikura | G03F 7/027 430/281.1 |
| 5,925,847 A * | 7/1999 | Rademacher et al. | 174/372 |
| 6,624,432 B1 * | 9/2003 | Gabower et al. | 250/515.1 |
| 8,191,231 B2 * | 6/2012 | Lo et al. | 29/600 |
| 8,319,116 B2 * | 11/2012 | Martinez-Vargas | H05K 1/116 174/260 |
| 8,824,140 B2 * | 9/2014 | Prest et al. | 361/679.56 |
| 8,858,854 B2 * | 10/2014 | Oin | 264/241 |
| 2003/0066672 A1 * | 4/2003 | Watchko et al. | 174/50 |
| 2004/0172502 A1 * | 9/2004 | Lionetta et al. | 711/112 |
| 2004/0239836 A1 | 12/2004 | Chase | |
| 2006/0039116 A1 * | 2/2006 | Chen | G06F 1/203 361/705 |
| 2007/0057853 A1 * | 3/2007 | Chang et al. | 343/702 |
| 2008/0044001 A1 | 2/2008 | Kim et al. | |
| 2008/0151503 A1 * | 6/2008 | Aapro et al. | 361/714 |
| 2008/0316117 A1 | 12/2008 | Hill et al. | |
| 2009/0002242 A1 * | 1/2009 | Lasarov et al. | 343/702 |
| 2009/0256757 A1 * | 10/2009 | Chiang et al. | 343/702 |
| 2009/0267266 A1 | 10/2009 | Lee et al. | |
| 2009/0279162 A1 * | 11/2009 | Chui | G02B 26/001 359/290 |
| 2010/0009094 A1 * | 1/2010 | Lochtman et al. | 427/555 |
| 2010/0097276 A1 * | 4/2010 | Lin | B44C 5/0453 343/702 |
| 2010/0149751 A1 * | 6/2010 | Camacho et al. | 361/679.55 |
| 2010/0277377 A1 * | 11/2010 | Sato et al. | 343/702 |
| 2010/0284552 A1 * | 11/2010 | Lasarov et al. | 381/150 |
| 2011/0250377 A1 * | 10/2011 | Qin | B29C 45/14311 428/99 |
| 2012/0262344 A1 * | 10/2012 | Tsai et al. | 343/702 |
| 2012/0313826 A1 * | 12/2012 | Wu | C23C 14/0652 343/702 |
| 2013/0082885 A1 * | 4/2013 | Chiang | 343/702 |
| 2013/0126465 A1 * | 5/2013 | Hu et al. | 216/13 |
| 2013/0141885 A1 * | 6/2013 | Gu et al. | 361/774 |
| 2013/0181893 A1 * | 7/2013 | Black et al. | 345/156 |
| 2013/0224406 A1 * | 8/2013 | Chang | H05K 13/0084 428/34.1 |

FOREIGN PATENT DOCUMENTS

| | | |
|---|---|---|
| TW | I238768 B | 9/2005 |
| WO | WO 2011/051408 A1 | 5/2011 |
| WO | WO 2011/123790 A1 | 10/2011 |
| WO | WO 2012 122300 A2 | 9/2012 |

OTHER PUBLICATIONS

Office Action for Japanese Application No. 2015-535075 dated Mar. 8, 2016.
Office Action for Korean Application No. 9-5-2016-028211243 dated Apr. 19, 2016.
Supplementary European Search Report for Application No. EP 13 84 4142 dated May 23, 2016.

* cited by examiner

METALLIZATION AND ANODIZATION OF PLASTIC AND CONDUCTIVE PARTS OF THE BODY OF AN APPARATUS

TECHNOLOGICAL FIELD

An example embodiment relates generally to the body of an apparatus and, more particularly, to the metallization and anodization of the plastic and conductive parts of the body of an apparatus, such as a portable electronic device.

BACKGROUND

The body of a mobile device, such as a cellular telephone, a laptop computer, a tablet computer, a personal digital assistant (PDA) or the like may include one or more metal parts and one or more plastic parts. For example, a polyphenylene sulfide (PPS) part may be insert molded or overmolded to an aluminum part to form the body of a mobile device. Although it may be desirable to form the entire body of a mobile device from metal such that the body is both strong and has a consistent and aesthetic appearance, many mobile devices are configured in such manner as to require the body to include some combination of plastic and metal parts. For example, a mobile device may include one or more antennas disposed within the body. In order to permit the transmission of radio frequency (RF) signals to and from the antennas, the portion of the body that is aligned with the antennas may be formed of plastic. Additionally, the body of some mobile devices may include a portion having a complex geometry that may be difficult, costly or otherwise inefficient to fabricate from a metal. Thus, the portion of the body of a mobile device that has a complex geometry may also be formed of plastic.

The inclusion of plastic parts within the body of a mobile device may introduce a number of issues. From an aesthetic standpoint, the plastic part may appear different than the metal part, thereby potentially reducing the attractiveness of the mobile device. For example, the plastic part may form a stripe, seam or window between metal parts of the body of the mobile device. Such a seam may be undesirable in some instances in which a seamless body is aesthetically preferable. Additionally, a body that includes a plastic part in the form of a stripe or seam may disadvantageously permit the metal parts that are physically separated by the plastic part to sometimes be inadvertently electrically connected by a user of the mobile device while carrying or holding the mobile device. Further, the surface of the plastic part may be softer than the surface of the metal part with this difference in the feel of a plastic part relative to a metal part being potentially disconcerting to the user of the mobile device.

To reduce the likelihood that a softer plastic part will be scratched, the plastic part may be coated separate from the metal part, such as by painting or the application of a hard coating to the plastic part, prior to combination with the metal part. As a result, the plastic parts and the metal parts may exhibit a color difference and/or the plastic parts and the metal parts may not be perfectly aligned with one another such that there is a step or offset exists between the plastic and metal parts, thereby detracting from the aesthetic appeal of body of the mobile device.

A non-conductive vapor metallization (NCVM) coating may be applied to the body of a mobile device having both plastic and metal parts so as to provide a metallic appearance to the plastic parts, thereby creating a more uniform appearance. However, the NCVM-coated plastic parts will still have a different tactile feeling than the metal parts and, in instances in which a top coat is been applied to the NCVM-coated plastic parts, the visual appearance of the plastic parts may no longer be metallic, that is, the plastic parts may no longer have a consistent appearance with the metal parts. Further, the surface hardness of an NCVM coating is less than that of metal, thereby potentially leading to increased wear of the NCVM coated plastic part which may, in turn, further increase the visual differences between the metal and plastic parts such that the resulting body of the mobile device eventually becomes less attractive.

BRIEF SUMMARY

A method of fabricating at least a portion of the body of an apparatus, such as a portable electronic device, that includes both plastic parts and conductive parts is provided in accordance with an example embodiment. As a result, the body of the apparatus and a portable electronic device are also provided according to example embodiments of the present invention with the body being relatively seamless such that the interface between the plastic and conductive parts is indistinguishable. As such, the body that is fabricated in accordance with an example embodiment of the invention may be more aesthetically attractive while still permitting plastic parts to be incorporated within the body, such as in conjunction with an antenna or with more geometrically complex parts. Further, the body that is fabricated in accordance with an example embodiment of the present invention may include plastic parts that are scratch resistant and that provide comparable tactile feedback as the conductive parts of the body.

In one embodiment, a method is provided for fabricating at least a portion of the body of a device. In this regard, a plastic part, such as a polyphenylene sulfide (PPS) part, may be combined with a conductive part, such as by insert molding, to form at least a portion of the body of the device. The method may also form a metal layer on the surfaces of the plastic part and the conductive part, such as by subjecting the surfaces of the plastic and conductive parts to vapor deposition, e.g., non-conductive vapor metallization, in order to metalize the surfaces of the plastic and conductive parts. In this regard, the metallization of the surfaces of the plastic and conductive parts may form a layer transparent to radio frequency signals on the surfaces of the plastic and conductive parts. The method of this embodiment also anodizes the metalized surfaces of the plastic and conductive parts, thereby producing at least a portion of the body of a device having plastic and conductive parts with a consistent appearance and a consistent tactile response.

The method of one embodiment may also include coating the surface of the plastic part with a primer prior to subjecting the surfaces of the plastic part and the conductive part to vapor deposition. The surface of the plastic part may be recessed relative to the surface of the conductive part prior to coating the surface of the plastic part with a primer. In this regard, the method may also include polishing the primer following coating of the surface of the plastic parts so as to align with the surface with the conductive part.

In another embodiment, a body of an apparatus is provided that includes a plastic part, such as a plastic part comprised of polyphenylene sulfide (PPS), and a conductive part that is combined with the plastic part. The body of the apparatus may also include a metallization layer, such as a metallization layer comprised of a material, e.g., aluminum, that is transparent to radio frequency signals, on the surfaces of the plastic part and the conductive part. The body of the apparatus of this embodiment also includes an anodization layer, such as an anodization layer comprised of a metal oxide, on the metallization layer on the surfaces of the plastic part and the conductive part. In one embodiment, the body of the apparatus also includes a primer disposed between the surface of the plastic part and the metallization layer.

In a further embodiment, a portable electronic device is provided that includes at least a portion of a housing that, in turn, includes a plastic part, such as a plastic part comprised of polyphenylene sulfide (PPS), and a conductive part combined with the plastic part. The at least a portion of the housing may also include a metallization layer, such as a metallization layer comprised of a material transparent to radio frequency signals, on surfaces of the plastic part and the conductive part. The at least a portion of a housing may also include an anodization layer, such as an anodization layer comprised of a metal oxide, on the metallization layer on the surfaces of the plastic part or the conductive part. The portable electronic device of this embodiment also includes electronic circuitry disposed at least partially within the housing.

In one embodiment, the electronic circuitry includes an antenna aligned with the plastic part. The housing of another embodiment may include first and second portions with the first portion having a more complex geometry than the second portion. The plastic part of this embodiment may form the first portion of the housing and the conductive part may form the second portion of the housing. In one embodiment, the at least a portion of the housing may further include a primer disposed between the surface of the plastic part and the metallization layer.

BRIEF DESCRIPTION OF THE DRAWINGS

Figure 1:
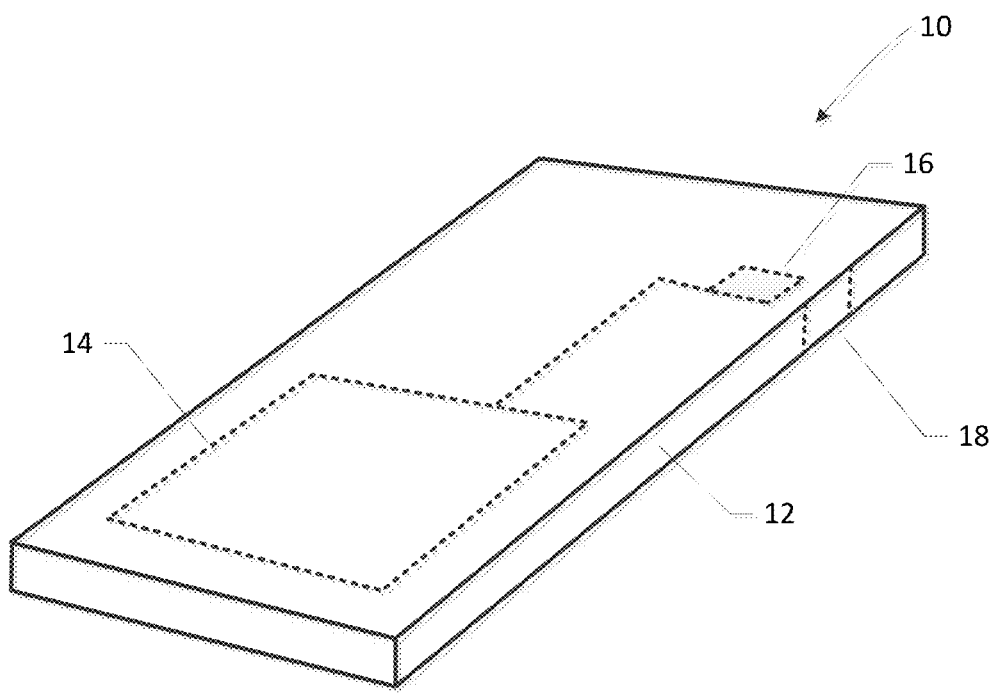
Figure 2:
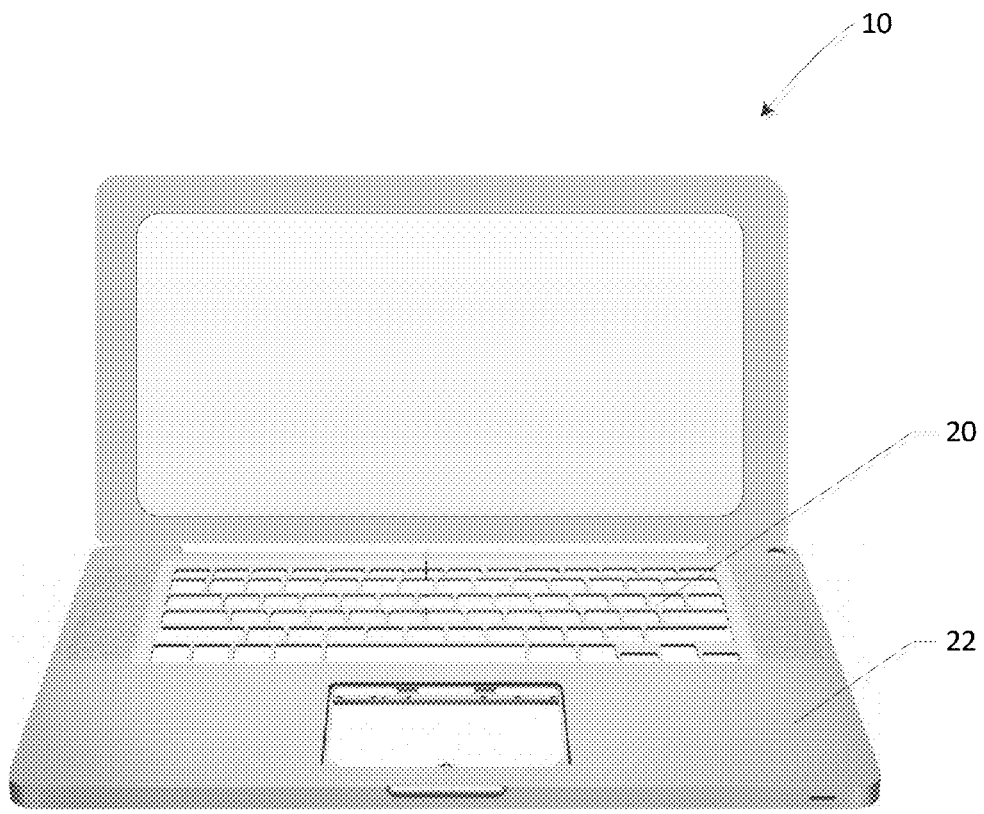
Figure 3:
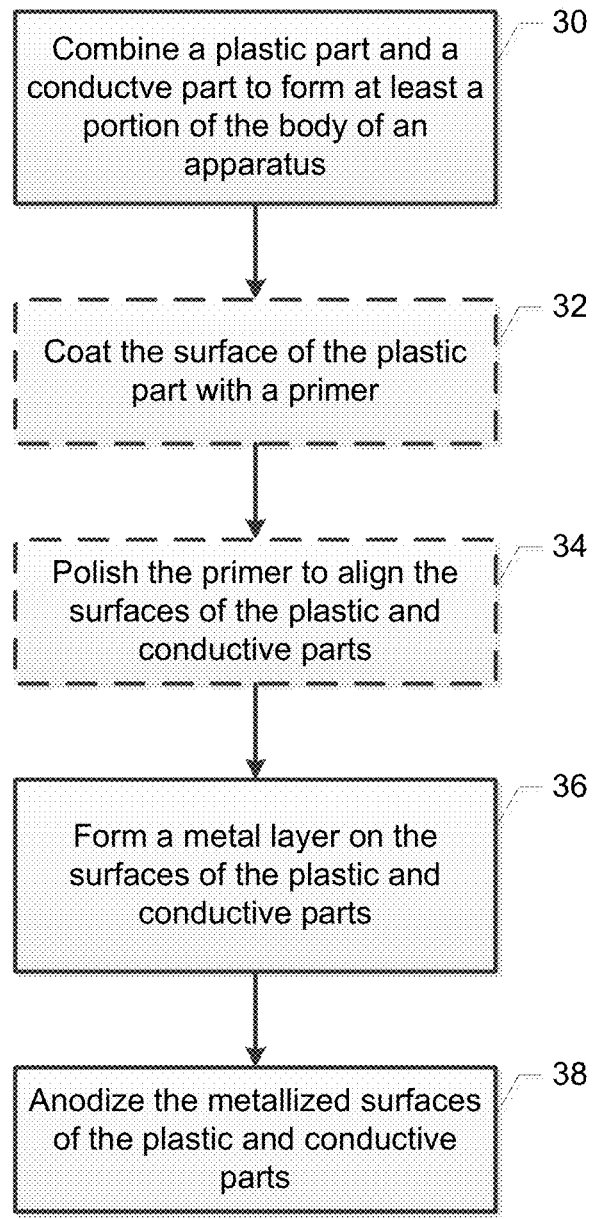
Figure 4A:
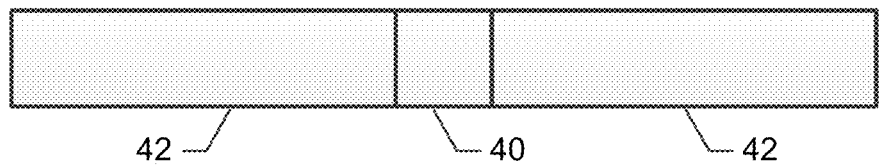
Figure 4B:
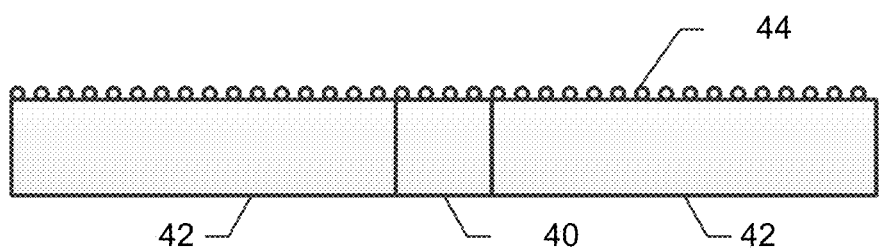
Figure 4C:
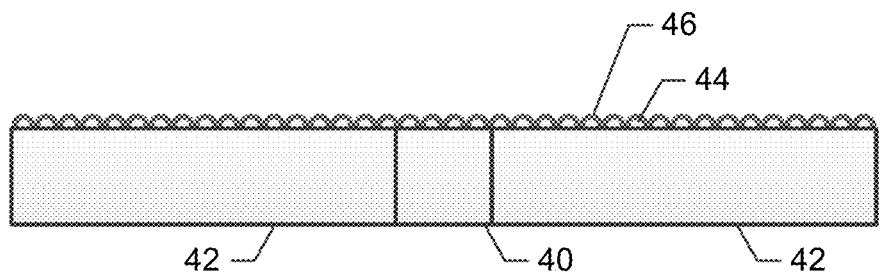

Having thus described certain example embodiments of the present invention in general terms, reference will hereinafter be made to the accompanying drawings, which are not necessarily drawn to scale, and wherein:

FIG. 1 is a perspective view of a portable electronic device that includes an antenna positioned within the housing and that may be fabricated in accordance with an example embodiment of the present invention;

FIG. 2 is a perspective view of another portable electronic device with a keyboard frame that has a more complex geometry than other portions of the housing and that may also be fabricated in accordance with an example embodiment of the present invention;

FIG. 3 is a flowchart illustrating operations performed to fabricate at least a portion of the body of a portable electronic device in accordance with an example embodiment of the present invention;

FIGS. 4A, 4B and 4C are sequential fragmentary cross-sectional views of at least a portion of the body of a portable electronic device during its fabrication in accordance with an example embodiment of the present invention; and FIGS. 5A, 5B, 5C, 5D and 5E are sequential fragmentary cross-sectional views of at least a portion of the body of a portable electronic device during its fabrication in accordance with another example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Portable electronic devices, such as a mobile telephone, e.g., a cellular telephone, a smartphone or the like, a personal digital assistant (PDA), a laptop computer, a tablet computer, a navigation system, a music player, a game player, computer workstation or any of numerous other computation devices, content generation devices, content consumption devices or combinations thereof, generally include a body, such as a housing, that provides strength and rigidity so as to protect electronic circuitry disposed within the housing. The body of a portable electronic device may also be configured to have an attractive aesthetic appearance so as to be appealing to a user. As described below, the body of some portable electronic devices may not be formed entirely of a conductive material, but may be formed of a combination of one or more conductive parts and one or more plastic parts. The body of a portable electronic device may include a plastic part for various reasons including the radio frequency (RF) transparency of the plastic part and/or the ability to more readily form complex geometrical shapes from a plastic part.

By way of example, FIG. 1 illustrates a portable electronic device 10, such as a mobile telephone, personal digital assistant (PDA) or the like, that includes a body 12, such as a housing, and electronic circuitry 14, such as one or more processors, one or more memories, etc., disposed at least partially and, more typically, entirely within the body of the portable electronic device, as represented by the dashed lines in FIG. 1. The electronic circuitry disposed within the body of the portable electronic device of this embodiment may include an antenna 16 for transmitting and/or receiving signals, such as RF signals. Since the conductive parts of the body may attenuate or block the signals transmitted to and from the antenna, the body of the portable electronic device of this embodiment may include a plastic part 18, e.g., a plastic window having a width, for example, of about 1 mm, with the antenna being aligned with the plastic parts such that signals are transmitted to and/or from the antenna through the plastic part, which is more RF transmissive than the metal parts and, in some instances, is transparent to RF signals. Although in FIG. 1, the antenna 16 is illustrated as being located at some distance from an inside surface of the body 12 of the portable electronic device 10, in other words there is a gap therebetween, this is merely an example. In one embodiment, the antenna 16 may be located less than 1 mm from the inside surface of the body 12, but not touching any part of the body 12. Alternatively, the antenna 16 may be located so as to be touching the inside surface of the plastic part 18 of the body 12 where the antenna 16 is a separate part from the body 12. Still further, the antenna 16 may be attached to and therefore touching the inside surface of the plastic part 18 of the body 12 and thus part of the body 12. In yet another embodiment, the antenna 17 may even be located more than 1 mm from the inside surface of the body 12. The antenna 16 may or may not touch the inside surface of the plastic part 18 of the body 12, but the conductive part of the antenna 16 may not touch any conductive part of the body 12.

As another example, FIG. 2 illustrates a portable electronic device 10, such as a laptop computer, that has a body that includes a first portion 20, such as a keyboard frame, having a more complex geometry than other, e.g., second, portions 22 of the housing. In this embodiment, the first portion having the more complex geometry may be formed by the plastic part, while the second portion of the housing that has the less complex geometry may be formed by the conductive part. In this regard, the conductive part may serve to provide strength and rigidity to the housing, while the plastic part is utilized to form the portion of the housing having a more complex geometry since structures having a more complex geometry are generally easier and/or less costly to form from plastic than from metal. The housing may have various structures with a complex geometry including, for example, one or more screw towers, fixing elements, snap fits, undercut shapes or the like. Although not shown, the portable electronic device of the embodiment of FIG. 2 may also include electronic circuitry at least partially disposed within the body.

In order to provide a portable electronic device 10 with a body 12, such as a housing, having both plastic and conductive parts, a method of fabricating the body of an apparatus, such as an electronic device and, more particularly, a portable electronic device may be provided as shown in FIG. 3. In this regard, one or more plastic parts and one or more conductive parts may be combined to form at least a portion of the body of the portable electronic device. See block 30 of FIG. 3. The plastic part and the conductive part may be combined in various manners including, for example, by co-molding the plastic part 40 and the conductive parts 42 as shown, for example, in FIG. 4A. In regards to co-molding the plastic and conductive parts, the plastic part may be insert molded relative to the conductive part. Alternatively, the conductive part may be overmolded with a plastic part. Regardless of the manner in which the plastic and conductive parts are combined, the combination of the plastic and conductive parts form the body.

The plastic part 40 may be formed of various plastic materials including plastic materials that are transparent to RF signals, such as polyphenylene sulfide (PPS). Alternatively, the plastic part may be formed from polycarbonate or polyamide materials or other plastic materials. The conductive parts 42 may also be formed of various conductive materials including, for example, aluminum, graphite, carbon, composite materials or the like.

As shown in block 36 of FIG. 3 and in FIG. 4B, the surfaces of the plastic part 40 and the conductive parts 42 may be metallized, such as by being subjected to vapor deposition or by printing of the metal thereupon, in order to form a metal layer on the surfaces of the plastic part and the conductive parts. In one embodiment, the surfaces of the plastic part and the conductive parts may be subjected to physical vapor deposition (PVD), such as a PVD sputtering process, in order to vacuum metalize the surfaces of the plastic part and the conductive parts. For example, the surfaces of the plastic part and the conductive parts may be subjected to non-conductive vapor metallization (NCVM). Alternatively, the surfaces of the plastic part and the conductive parts may be subjected to chemical vapor deposition (CVD) in order to metalize the surfaces of the plastic part and the conductive parts. For example, the surfaces of the plastic part and the conductive parts may be subjected to electroplating. Still further, the vapor deposition of one embodiment may include physical vapor deposition followed by chemical vapor deposition in order to permit the thickness of the metallization layer to be more readily tailored.

In one embodiment, the entire surface of the body 12 of the portable electronic device 10 including the entirety of the surfaces of the plastic and conductive parts is subjected to metallization, such as NCVM. As such, the surface of the body of the portable electronic device need not be masked during the metallization, thereby increasing the efficiency of the fabrication procedure. As a result of having metallized the surfaces of the plastic part and the conductive parts, a layer 44 comprised of a plurality of metal particles may be deposited upon the surfaces of the plastic and conductive parts as shown in FIG. 4B with the layer formed by metallization being transparent to RF signals. In addition to RF transparency, the layer deposited by metallization may provide a consistent metallic appearance not only to the conductive parts, but also to the plastic part. In the illustrated embodiment, the layer formed by the metal particles is shown to be uniform, although the deposition of the metal particles and the corresponding layer formed by the metal particles need not be uniform and may be irregular in response to a more random deposition of the metal particles. The layer formed by the metallization may be comprised of various materials including, for example, aluminum.

As shown in block 38 of FIG. 3 and in FIG. 4C, the metallized surfaces of the plastic and conductive parts may then be anodized. In one embodiment, the entire surface of the body 12 of the portable electronic device 10 including the entirety of the surfaces of the plastic and conductive parts may be anodized such that there is also no need for masking the surface of the body of the portable electronic device during anodization, thereby further increasing the efficiency of the fabrication procedure. The coating 46 that is deposited by the anodization may be formed of a variety of materials, such as a non-conductive metal-oxide, e.g., aluminum oxide, or other metallic coatings, thereby reducing issues relating to short circuiting of the conductive parts 42 that form the body of the portable electronic device since the anodization coating is electrically non-conductive. The anodization of the body of the portable electronic device is relatively hard and provides for scratch resistance. However, the coating applied by anodization is relatively thin such that the resulting coating is transparent to signals transmitted to and from an antenna disposed within the body of the portable electronic device, such as RF signals. In one embodiment, for example, the coating formed by anodization may have a thickness of no more than 50 μm and, in one embodiment, of no more than 10-20 μm. The anodization coating provides a seamless appearance even though the body is formed of both plastic and conductive parts, thereby improving the aesthetic appearance of the body of the portable electronic device. In this regard, the coating formed by anodization may also be dyed so as to have various colors and/or may be subjected to various surface finishes to further facilitate the aesthetic appearance of the portable electronic device.

Figure 5A:
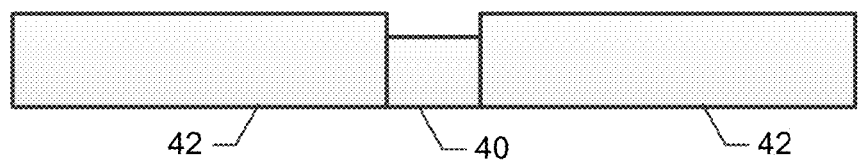
Figure 5B:
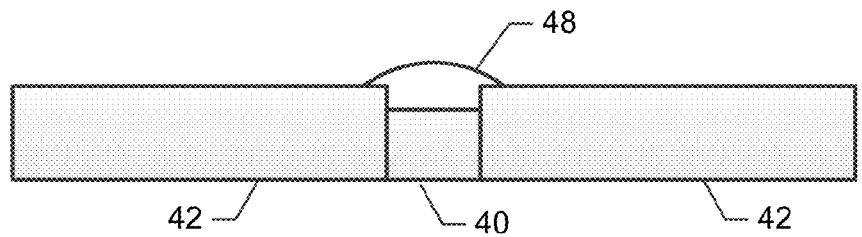
Figure 5C:
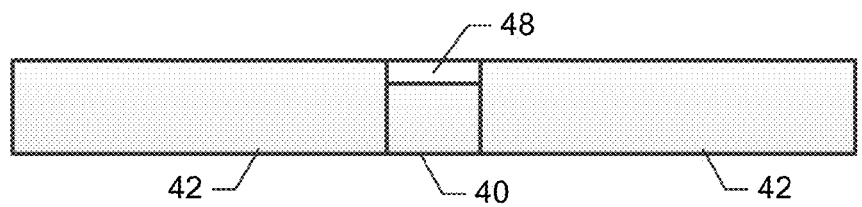
Figure 5D:
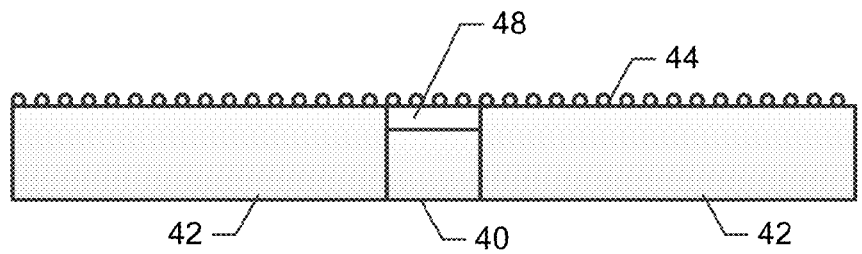
Figure 5E:
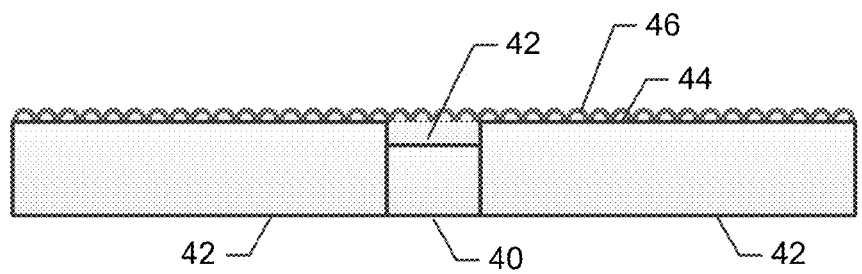

By first subjecting the surfaces of the plastic and conductive parts to metallization, such as physical vapor deposition, e.g., NCVM, prior to anodizing the body 12 of the portable electronic device 10, the layer 44 formed by metallization serves to activate the surface of the plastic part 40 so as to permit anodization of the plastic part, concurrent with the anodization of the conductive parts 42. As such, the layer formed by the metallization may have a thickness that is sufficiently thick in order to support or activate the surface of the plastic part for subsequent anodization, while remaining thin enough to be transparent for the signals transmitted to and/or from the antenna, such RF signals. In one embodiment, for example, the layer formed by metallization may have a thickness between 0.001 μm and 10 μm. In one embodiment, as shown by the optional blocks having a dashed outline in FIG. 3 and as further illustrated in FIGS. 5A-5E, the surface of the plastic part 40 may be primed prior to the metallization in order to ensure that the layer formed by the metallization adheres to the surface of the plastic part. In this regard and as shown in FIG. 5A, the surface of the plastic part of one embodiment may be recessed relative to the surface of the conductive part 42 that is positioned adjacent to the plastic part. In this embodiment, the surface of the plastic part may then be coated with a primer 48, such as ultraviolet (UV)-cured acrylates, epoxies, polyurethane-based lacquers or combination thereof, prior to subjecting the surfaces of the plastic and conductive parts to metallization, such as vapor deposition, e.g., to NCVM. See block 32 of FIG. 3 and FIG. 5B. Thereafter, the primer that has coated the surface of the plastic part may be polished so as to be aligned with the surface of the conductive part. See block 34 FIG. 3 and FIG. 5C. As described above, the surfaces of the plastic part, such as the primed surface of the plastic part and the surface of the conductive part, may be subjected to metallization, such as vapor deposition, e.g., NCVM, in order to metallize the surfaces of the plastic and conductive parts. See block 36 of FIG. 3 and FIG. 5D. The metallized surfaces of the plastic and conductive parts may be anodized as also described above and as shown in block 38 of FIG. 3 and FIG. 5E.

In some example embodiments, certain ones of the operations described in conjunction with FIG. 3 may be modified or further amplified as described below. Moreover, in some embodiments additional optional operations may also be included, such as illustrated by the operations represented by blocks with dashed lines in FIG. 3. It should be appreciated that each of the modifications, optional additions or amplifications may be included with the operations described above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   combining a plastic part and a conductive part to form at least a portion of a body of a portable electronic device;
   forming a metal layer on and immediately adjacent to all exterior surfaces of both the plastic part and the conductive part in order to metallize all of the exterior surfaces of both the plastic part and the conductive part; and
   anodizing all of the metallized surfaces of both the plastic part and the conductive part,
   wherein the body including the plastic part, the conductive part, the metallization layer and the anodization layer form the exterior surface of the portable electronic device.

2. A method according to claim 1 wherein forming the metal layer on the surfaces of the plastic part and the conductive part comprises subjecting the surfaces of the plastic part and the conductive part to vapor deposition.

3. A method according to claim 2 wherein subjecting the surfaces of the plastic part and the conductive part to vapor deposition comprises subjecting the surfaces of the plastic part and the conductive part to non-conductive vapor metallization.

4. A method according to claim 3 wherein subjecting the surfaces of the plastic part and the conductive part to non-conductive vapor metallization comprises forming a layer transparent to radio frequency signals on the surfaces of the plastic part and the conductive part.

5. A method according to claim 1 wherein combining the plastic part and the conductive part comprises insert molding the plastic part relative to the conductive part.

6. A method according to claim 1 further comprising coating the surface of the plastic part with a primer prior to forming the metal layer on the surfaces of the plastic part and the conductive part.

7. A method according to claim 6 wherein the surface of the plastic part is recessed relative to the surface of the conductive part prior to coating the surface of the plastic part with the primer, and wherein the method further comprises polishing the primer following coating of the surface of the plastic part so as to align with the surface of the conductive part.

8. A body of an apparatus comprising:
   a plastic part;
   a conductive part combined with the plastic part;
   a metallization layer on and immediately adjacent to all exterior surfaces of both the plastic part and the conductive part; and
   an anodization layer on the metallization layer on all of the exterior surfaces of both the plastic part and the conductive part,
   wherein the body including the plastic part, the conductive part, the metallization layer and the anodization layer form the exterior surface of the apparatus.

9. The body of an apparatus according to claim 8 wherein the metallization layer is comprised of a material transparent to radio frequency signals.

10. The body of an apparatus according to claim 9 wherein the metallization layer is comprised of aluminum.

11. The body of an apparatus according to claim 8 wherein the plastic part is comprised of polyphenylene sulfide (PPS).

12. The body of an apparatus according to claim 8 wherein the anodization layer is comprised of a metal oxide.

13. The body of an apparatus according to claim 8 further comprising a primer disposed between the surface of the plastic part and the metallization layer.

14. A portable electronic device comprising:
at least a portion of a housing comprising a plastic part and a conductive part combined with the plastic part, a metallization layer on and immediately adjacent to all exterior surfaces of both the plastic part and the conductive part, and an anodization layer on the metallization layer on all of the exterior surfaces of both the plastic part and the conductive part, wherein the housing including the plastic part, the conductive part, the metallization layer and the anodization layer form the exterior surface of the portable electronic device; and
electronic circuitry disposed at least partially within the housing.

15. The portable electronic device according to claim 14 wherein the electronic circuitry comprises an antenna aligned with the plastic part.

16. The portable electronic device according to claim 14 wherein the housing includes first and second portions with the first portion having a more complex geometry than the second portion, wherein the plastic part forms the first portion of the housing and the conductive part forms the second portion of the housing.

17. The portable electronic device according to claim 14 wherein the metallization layer is comprised of a material transparent to radio frequency signals.

18. The portable electronic device according to claim 14 wherein the plastic part is comprised of polyphenylene sulfide (PPS).

19. The portable electronic device according to claim 14 wherein the anodization layer is comprised of a metal oxide.

20. The portable electronic device according to claim 14 wherein the at least a portion of the housing further comprises a primer disposed between the surface of the plastic part and the metallization layer.

* * * * *